INVENTOR
JOHN R. THORSON

BY
A. Fredrick Lamann
ATTORNEY

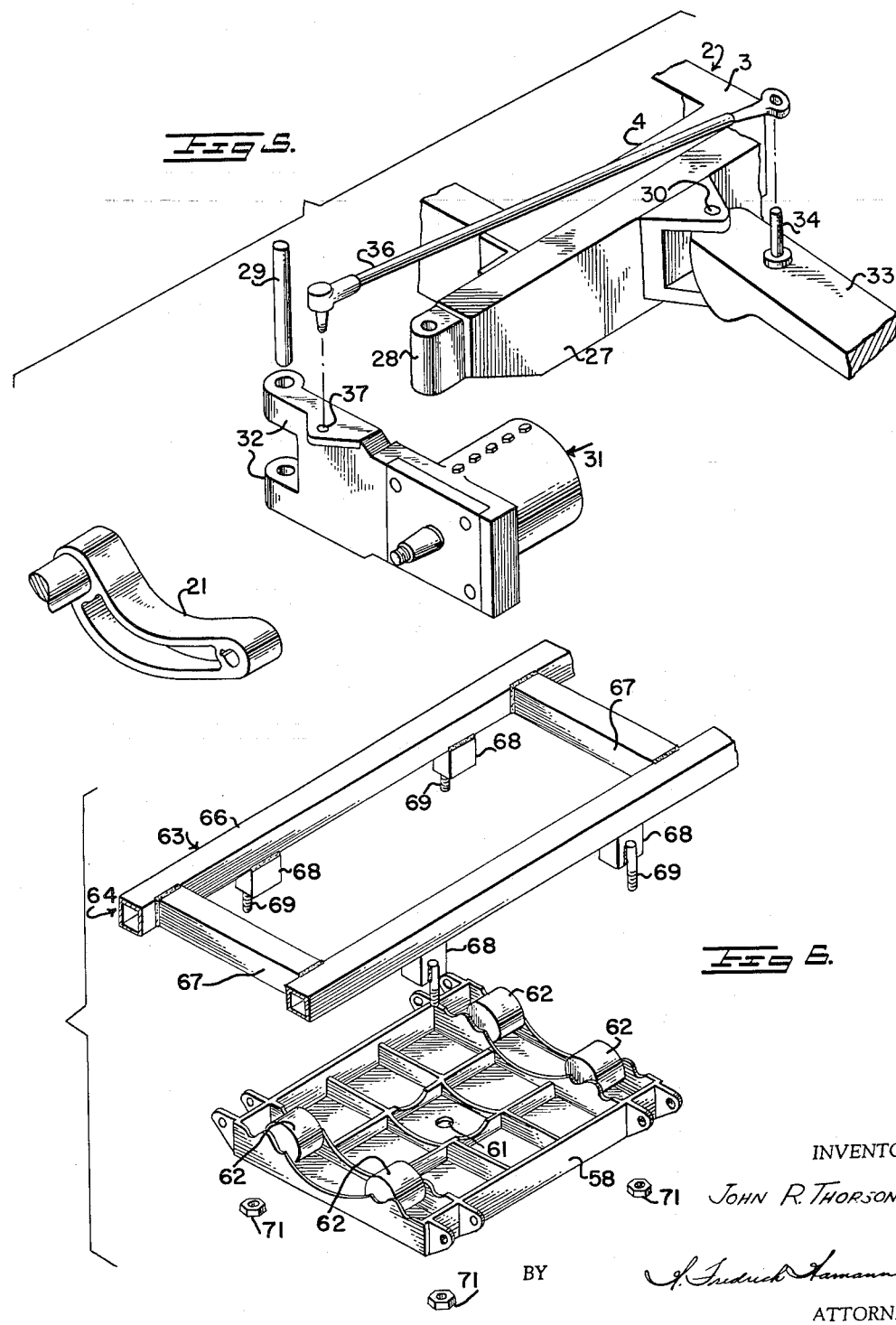

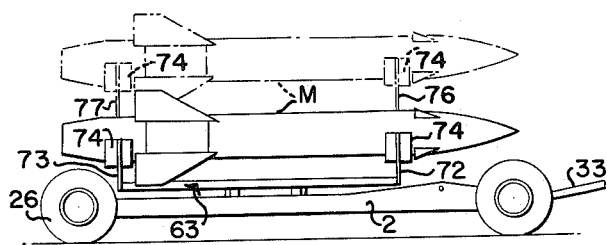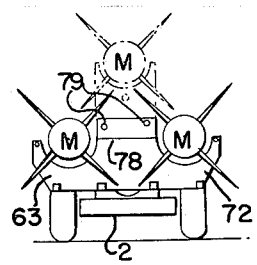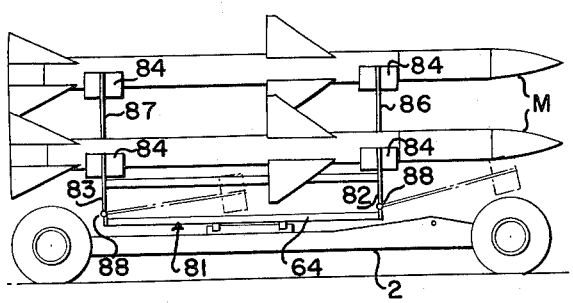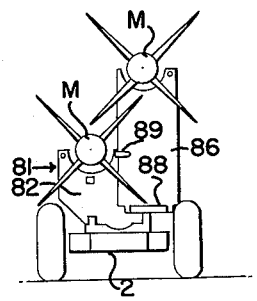

July 2, 1963  J. R. THORSON  3,095,981
TRAILER
Filed June 22, 1959  5 Sheets-Sheet 5
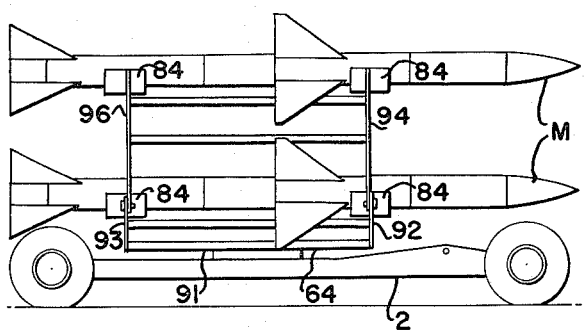
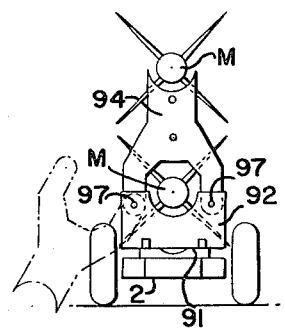
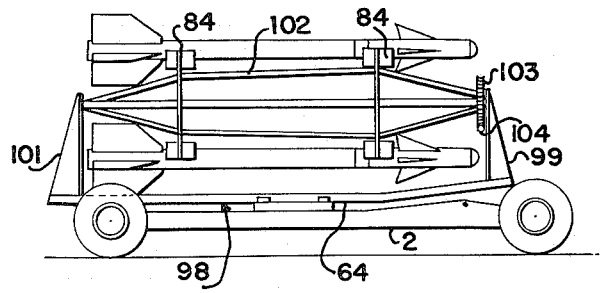
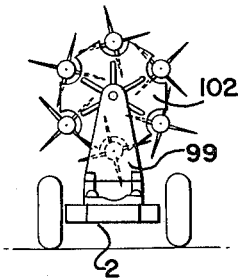
INVENTOR
JOHN R. THORSON
BY
ATTORNEY United States Patent Office 3,095,981
Patented July 2, 1963

3,095,981
TRAILER
John R. Thorson, Takoma Park, Md., assignor to ACF Industries, Incorporated, New York, N.Y., a corporation of New Jersey
Filed June 22, 1959, Ser. No. 822,106
5 Claims. (Cl. 214—1)

This invention relates to trailers and, more particularly, to four-wheel trailers adapted for use in transporting bombs or missiles from a munitions dump area to airplanes on a flight line.

An object of the invention resides in the provision of a trailer adapted for use in transporting bombs and missiles of different shapes and sizes.

Another object of the invention is to provide a trailer embodying means for elevating bombs or missiles to different levels for attachment to airplanes.

Another object of the invention resides in the provision of a trailer provided with a bomb cradle for detachable engagement with missile supporting racks of different shapes and sizes.

A further object of the invention is to provide individual trailing wheel suspension units for the trailer to reduce vibration, tilting, and shock during movement of the trailer over rough terrain.

The invention embodies other novel features, details of construction and arrangement of parts which are hereinafter set forth in the specification and claims and illustrated in the accompanying drawings, forming part thereof, wherein:

FIG. 5 is an explosion view illustrating a front trailing wheel suspension unit.

FIG. 6 is an explosion view illustrating a bomb cradle and a missile rack frame for detachable engagement therewith.

FIG. 7 is a side elevation illustrating one form of missile rack mounted on the trailer for supporting three missiles.

FIG. 8 is an end elevation of same.

FIG. 9 is a side elevation illustrating another form of missile rack mounted on the trailer for supporting two missiles.

FIG. 10 is an end elevation of same.

FIG. 11 is a side elevation illustrating another form of missile rack mounted on the trailer for supporting two missiles.

FIG. 12 is an end elevation of same.

FIG. 13 is a side elevation illustrating another form of missile rack mounted on the trailer for supporting six missiles.

FIG. 14 is an end elevation of same.

Figure 1:
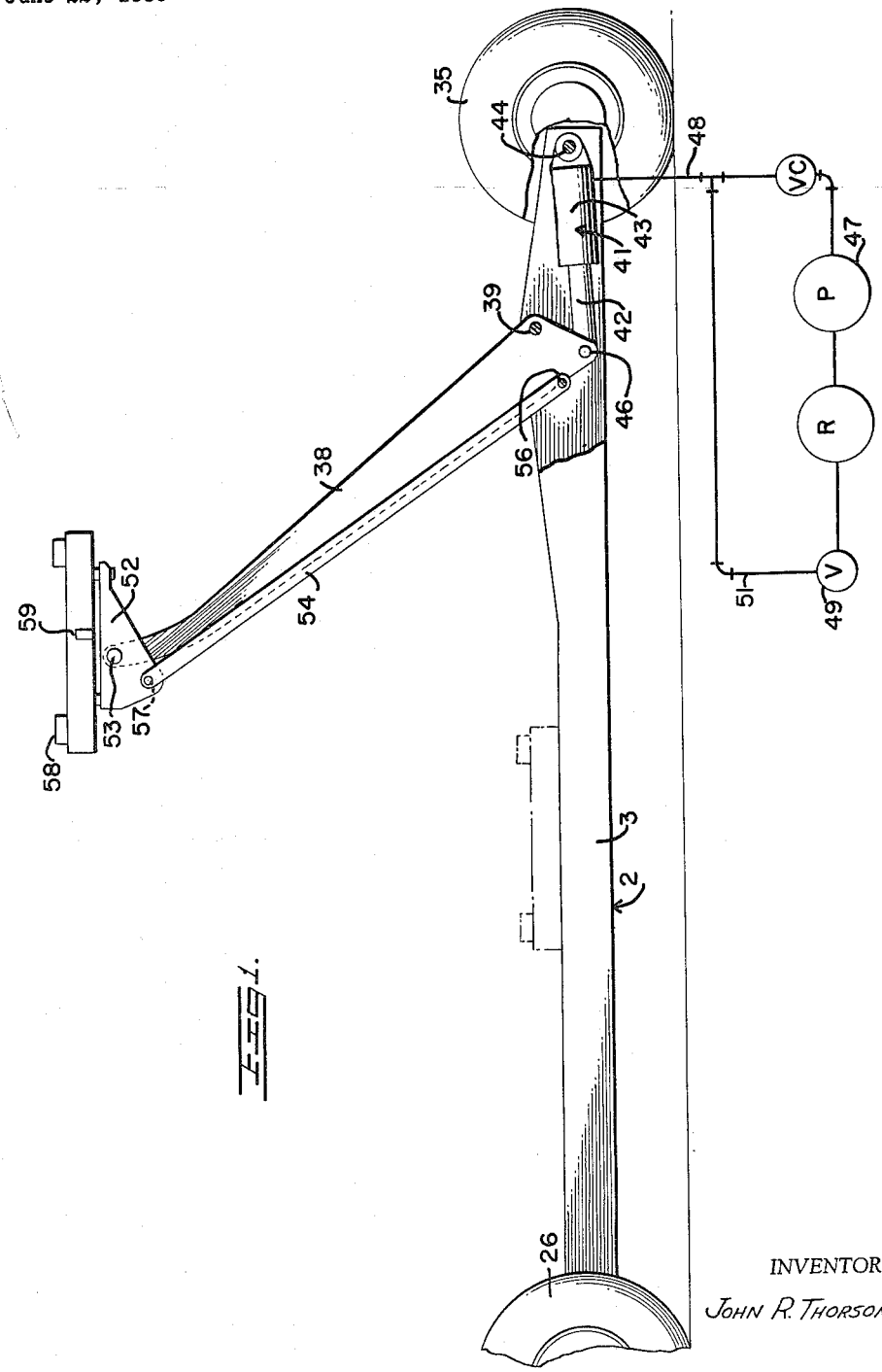
FIG. 1 is a side elevation illustrating a four wheel trailer embodying features of the invention.

Referring now to the drawings for a better understanding of the invention and more particularly to FIGS. 1 to 8 therein, the trailer is shown as comprising a frame 2 having side rails 3—3 interconnected at their ends by end rails 4—4. To provide a smooth even ride for bombs or missiles, the frame 2 is resiliently supported upon four individual trailing wheel suspension units.

Figure 2:
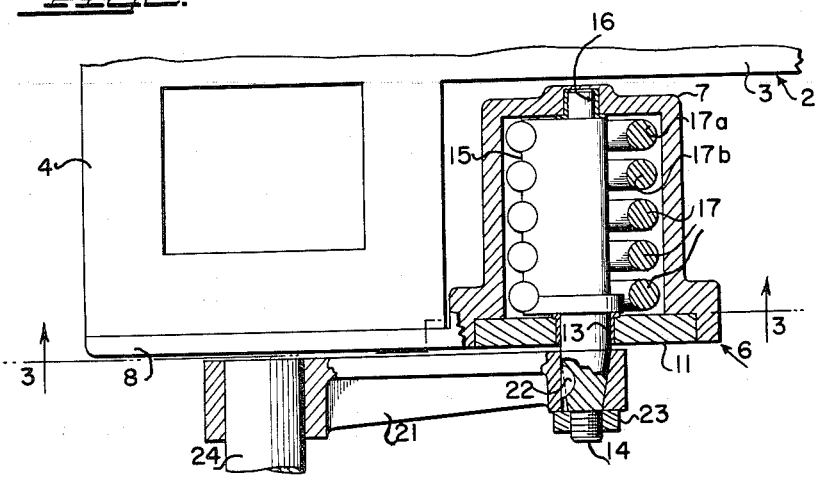
FIG. 2 is a fragmentary top plan view, partly in section, illustrating a rear trailing wheel suspension unit embodying features of the invention.
Figure 3:
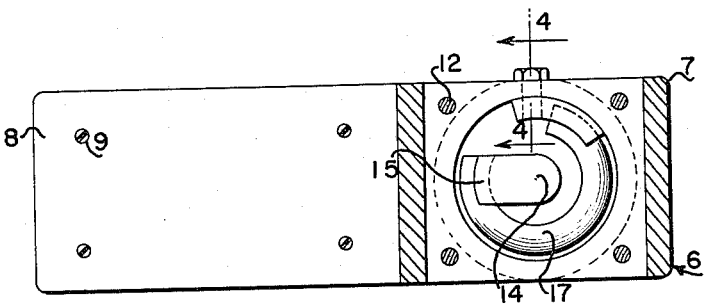
FIG. 3 is a section taken along the line 3—3 of FIG. 2.
Figure 4:
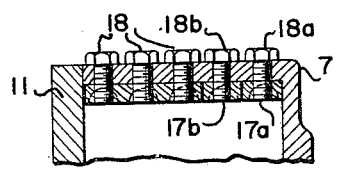
FIG. 4 is a section taken along the line 4—4 of FIG. 3.

As illustrated in FIGS. 2 to 4, each rear suspension unit 6 is shown as comprising a housing 7 formed with a flange 8 secured to the trailer frame 2 by means of screws 9. A cover 11 is secured by screws 12 to the outboard side of the housing and provided with a bearing 13 to receive the outer end of a shaft 14 which has its inner end journaled in a bearing 16. A plurality of resilient C-shape spring members 17 are secured at one of their ends to an eccentric portion 15 on the shaft 14 by weld joints, and are secured at their opposite ends to the housing 7 by means of screws 18.

Figure 4A:
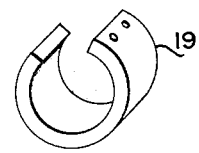
FIG. 4a is a perspective view showing a modified form of spring element for a trailing wheel suspension unit.

It will be noted that the two inboard spring members 17a and 17b are secured to the housing 7 by means of individual screws 18a and 18b which, if desired, may be removed to reduce the torque load necessary to rotate the shaft 14 through a predetermined arc. While the spring members 17 have been shown as formed of round steel rod, it is contemplated that they could be formed of stock of square or rectangular section, in which event a single C-shape spring 19 of flat stock (see FIG. 4a) could be used in place of the three outboard springs, and the two inboard springs could be formed of square stock.

A crank arm 21 is secured to the outboard end of the shaft 14 by means of a key 22 and a nut 23 and normally extends downwardly and rearwardly of the trailer. An axle 24 is secured to the free end of the crank arm 21 to support a rear wheel 26 for rotational movement thereon, the wheel being engaged against axial displacement by means of a nut threaded onto the outer end of the axle.

As illustrated in FIG. 5, a transverse member 27 is secured to the front end of the frame 2 and provided at its ends with bearings 28 to receive pivot pins 29 adapted to support front trailing wheel suspension units 31. Each unit 31 is provided with a pair of bearings 32—32 to straddle its respective bearing 28 and to be pivotally connected thereto by a pivot pin 29. A draw bar 33 is pivotally connected at 30 to the transverse member 27 for engagement by a tractor and is also pivotally connected at 34 to the inner ends of steering rods 36—36 which have their outer ends pivotally connected at 37 to their respective units 31. The front trailing wheel suspension units 31 are otherwise similar to the rear units 6 heretofore shown and described and are provided with front trailing wheels 35.

An elevator arm 38 is pivotally connected at 39 to the frame 2 between the side members 3—3 and is actuated by means of a hydraulic power unit 41 comprising a piston 42 mounted in a cylinder 43. The cylinder 43 is pivotally connected at 44 to the front end of the frame 2, and the piston 42 is pivotally connected at 46 to the arm 38. To pivot the arm 38 upwardly, liquid under pressure from a manually operable pump 47 is directed through a conduit 48 into the cylinder 43. To lower the arm 38, a valve 49 in a return conduit 51 is opened manually.

A platform 52 is pivotally connected at 53 to the free end of the elevator arm 38 and is maintained in a plane parallel to the frame 2 by means of a parallel link 54 which is pivotally connected at 56 to the frame and at 57 to the platform. A bomb cradle 58 is mounted on the platform 52 and secured thereto by a bolt 59 which projects upwardly through an opening 61 in the cradle. Four rollers 62 are journaled on the cradle 58 to support a bomb for rotational movement about its longitudinal axis to facilitate attachment of the bomb to an aircraft bomb rack.

To adapt the trailer for use in transporting missiles from a storage area to a flight line, a missile rack is detachably secured to the cradle 58. As illustrated in FIGS. 6, 7 and 8, a missile rack 63 is shown as comprising a frame 64 having side members 66 interconnected by cross members 67. Legs 68 are provided on the side members 66 to engage the cradle 58, and studs 69 are welded to the legs for insertion through apertures (not shown) which are located in the bottom plate 60 of cradle 58 in the four corners thereof between each of side members 70 of cradle 58 and rollers 62, the studs 69 having threaded ends to receive nuts 71 when frame 64 is in place atop cradle 58 and studs 69 project through the apertures in bottom plate 60 of cradle 58. The over-all longitudinal dimension of frame 64 is determined by the particular bomb or missile to be handled.

Identical upright front and rear walls 72 and 73 are secured to opposite ends of the frame 64 and provided with arcuate pads 74 to receive a pair of missiles M. Upper walls 76 and 77 are pivotally mounted at 78 on the walls 72 and 73 and provided with arcuate pads 74 to receive a missile M, the upper walls being secured against pivotal movement by means of bolts 79. Belts with buckles thereon are provided on the several pads 74 in the normal manner as by fastening one end of each belt to the sides of such pads 74 with the buckles to be fitted atop the missile itself in order to prevent displacement of missiles therefrom. During transfer of missiles from the trailer to an airplane, the top missile is removed first, and the upper walls 76 and 77 are then pivoted downwardly manually to facilitate removal of the lower pair of missiles.

FIGS. 9 and 10 illustrate a modified form of the invention in which the missile rack 81 is shown as comprising a frame 64 having front and rear walls 82 and 83 secured thereto and provided with arcuate pads 84 to receive a missile M. Upper walls 86 and 87 are pivotally connected at 88 to the walls 82 and 83 and provided with arcuate pads 84 to receive a missile, the upper walls being secured in upright position by means of removable stop fingers 89 bolted thereto for engagement with the walls 82 and 83. The missiles are secured to the pads 84 by conventional belts and buckles. After transfer of the upper missile from the rack to a plane, the upper walls are pivoted downwardly to facilitate transfer of the lower missile.

FIGS. 11 and 12 illustrate another embodiment of the invention wherein the missile rack 91 is shown as comprising a frame 64 having front and rear walls 92 and 93 secured thereon and provided with arcuate pads 84 to receive a missile M. Upper walls 94 and 96 are secured to the walls 92 and 93, respectively, by means of bolts 97 and provided with arcuate pads 84 to receive an upper missile M. After transfer of the upper missile to a plane, a bolt 97 is removed to permit downward pivotal movement of the upper walls 94 and 96 to permit transfer of the lower missile to a plane. The missiles are secured to the pads 84 by means of conventional belts and buckles.

FIGS. 13 and 14 illustrate another embodiment of the invention wherein the missile rack 98 is shown as comprising a frame 64 having front and rear bearing brackets 99 and 101 secured thereon. A carrier wheel 102 is journaled at its ends in the brackets 99 and 101 and provided with arcuate pads 84 to receive missiles M. A worm gear 103 is secured to the wheel 102 for engagement by a manually rotatable worm 104 journaled on the front bracket 99. The missiles are secured against displacement from their respective pads 84 by means of conventional belts and buckets provided on the pads.

Having described a preferred embodiments of the present invention, it is to be understood that although specific terms and examples are employed, they are used in a generic and descriptive sense and not for purposes of limitation; the scope of the invention being set forth in the following claims.

What is claimed is:

1. In a trailer, a frame supported on wheel and axle assemblies, a cantilever elevator arm pivotally mounted on said frame, a base pivotally mounted on the free end of said cantilever arm, parallel linkage means to maintain said base parallel to said frame during pivotal movement of said cantilever arm, a missile rack mounted on said base for rotational movement about a vertical axis, said rack comprising a rack frame, front and rear walls on opposite ends of said rack frame, upper walls pivotally mounted on said front and rear walls, and arcuate pads on said walls to support missiles.

2. In a trailer, a frame supported on wheel and axle assemblies, a cantilever elevator arm pivotally mounted on said frame, a base pivotally mounted on the free end of said cantilever arm, parallel linkage means to maintain said base parallel to said frame during pivotal movement of said cantilever arm, a missile rack mounted on said base for rotational movement about a vertical axis, said rack comprising a rack frame, front and rear walls on opposite ends of said rack frame, upper walls pivotally mounted on said front and rear walls, and arcuate pads on said walls to support missiles, said pads being arranged in pairs to support two missiles in parallel relationship.

3. In a trailer, a frame supported on wheel and axle assemblies, a cantilever elevator arm pivotally mounted on said frame, a base pivotally mounted on the free end of said cantilever arm, parallel linkage means to maintain said base parallel to said frame during pivotal movement of said cantilever arm, a missile rack mounted on said base for rotational movement about a vertical axis, said rack comprising a rack frame, front and rear walls on opposite ends of said rack frame, upper walls pivotally mounted on said front and rear walls, and arcuate pads on said walls to support missiles, said pads being arranged in pairs to support two missiles in parallel relationship on said front and rear walls, another pair of pads being provided on said upper walls to support a third missile.

4. In a trailer, a frame supported on wheel and axle assemblies, a cantilever elevator arm pivotally mounted on said frame, a base pivotally mounted on the free end of said cantilever arm, parallel linkage means to maintain said base parallel to said frame during pivotal movement of said cantilever arm, a missile rack mounted on said base for rotational movement about a vertical axis, said rack comprising a rack frame, a missile carrier journaled on said rack frame for rotational movement about a horizontal axis, and means to secure a plurality of missiles on said carrier.

5. In a trailer, a frame supported on wheel and axle assemblies, a cantilever elevator arm pivotally mounted on said frame, a base pivotally mounted on the free end of said cantilever arm, parallel linkage means to maintain said base parallel to said frame during pivotal movement of said cantilever arm, a missile rack mounted on said base for rotational movement about a vertical axis, said rack comprising a rack frame, a missile carrier journaled on said rack frame for rotational movement about a horizontal axis, means to secure a plurality of missiles on said carrier, and means to rotate said carrier.

References Cited in the file of this patent

UNITED STATES PATENTS

| | | |
|---|---|---|
| 298,016 | Moore | May 6, 1884 |
| 1,115,746 | Stewart | Nov. 3, 1914 |
| 1,400,253 | Wicker | Dec. 13, 1921 |
| 2,189,010 | Lewis | Feb. 6, 1940 |
| 2,485,909 | Mosteller | Oct. 25, 1949 |
| 2,526,866 | Hersey | Oct. 24, 1950 |
| 2,593,472 | McGinn | Apr. 22, 1952 |
| 2,613,822 | Stanley | Oct. 14, 1952 |
| 2,712,874 | Murray | July 12, 1955 |
| 2,862,631 | Gamble | Dec. 2, 1958 |

FOREIGN PATENTS

| | | |
|---|---|---|
| 772,052 | France | Oct. 23, 1934 |